United States Patent [19]

Lebrun et al.

[11] Patent Number: 5,566,605
[45] Date of Patent: Oct. 22, 1996

[54] CENTRIFUGAL TYPE EXTRACTION CELL HAVING A DEFORMABLE SEALING JOINT FOR A HOT BEVERAGE PREPARATION MACHINE

[75] Inventors: Erik Lebrun, Ibos; Jean-Paul Astegno, Espoey; Alain Macera, Lanne; Alexandre Rouches, Tarbes; Jean-Michael Dulout, Sazos, all of France

[73] Assignee: SEB S.A., Ecully, France

[21] Appl. No.: 503,065

[22] Filed: Jul. 14, 1995

Related U.S. Application Data

[63] Continuation-in-part of Ser. No. 338,105, Nov. 9, 1994, abandoned.

[30] Foreign Application Priority Data

Nov. 9, 1993 [FR] France ................... 93 13606

[51] Int. Cl.$^6$ ................................. A47J 31/22
[52] U.S. Cl. ................... 99/302 C; 210/351; 210/356; 494/48
[58] Field of Search ............... 99/279, 287, 295, 99/298, 300, 302 R, 302 C, 302 FB, 303; 426/433; 210/356, 351, 360.1; 494/38, 43, 48

[56] References Cited

U.S. PATENT DOCUMENTS

| | | | |
|---|---|---|---|
| 3,025,781 | 3/1962 | Bossi | 99/302 C |
| 3,453,083 | 7/1969 | Beeri | 210/360.1 |
| 3,812,773 | 5/1974 | Hultsch | 99/302 C |
| 3,967,546 | 7/1976 | Cailliot . | |
| 4,473,002 | 9/1984 | Leuschner | 99/302 C |
| 4,476,776 | 10/1984 | Greutert | 99/302 C |
| 4,641,572 | 2/1987 | Varga | 99/302 C |
| 4,813,923 | 3/1989 | Johansson | 494/48 |
| 4,962,693 | 10/1990 | Miwa | 99/302 C |

FOREIGN PATENT DOCUMENTS

| | | |
|---|---|---|
| 1015716 | 8/1977 | Canada . |
| 1584848 | 1/1970 | France . |
| 2685186 | 6/1993 | France . |
| 2428188 | 1/1975 | Germany . |
| 3529053 | 2/1987 | Germany . |
| 969179 | 9/1964 | United Kingdom . |

OTHER PUBLICATIONS

French Search Report, 3 Aug., 1994 James D. Hardy, "Body Temperature Regulation", *Metabolism*, pp. 1417–1455.

*Primary Examiner*—Robert W. Jenkins
*Attorney, Agent, or Firm*—Loeb & Loeb LLP

[57] ABSTRACT

An extraction cell of the centrifugal type for a hot beverage preparation machine, including a grounds collection drum on which is mounted, in a sealed manner by a sealing structure, a cover provided with a liquid delivery orifice, and a filtration structure, wherein the filtration structure and the sealing structure are constituted by at least one deformable joint, or seal, interposed in a groove between the drum and cover, the joint having deformation properties, and being mounted to be compressed by an amount which is in a pre-established compression range with the aid of a compression controlling means, to insure that below a pre-established operating pressure existing in the cell, fluid tightness of the cell is maintained, and beyond that pressure, filtration of the grounds-liquid mixture occurs by deformation of the joint.

18 Claims, 4 Drawing Sheets

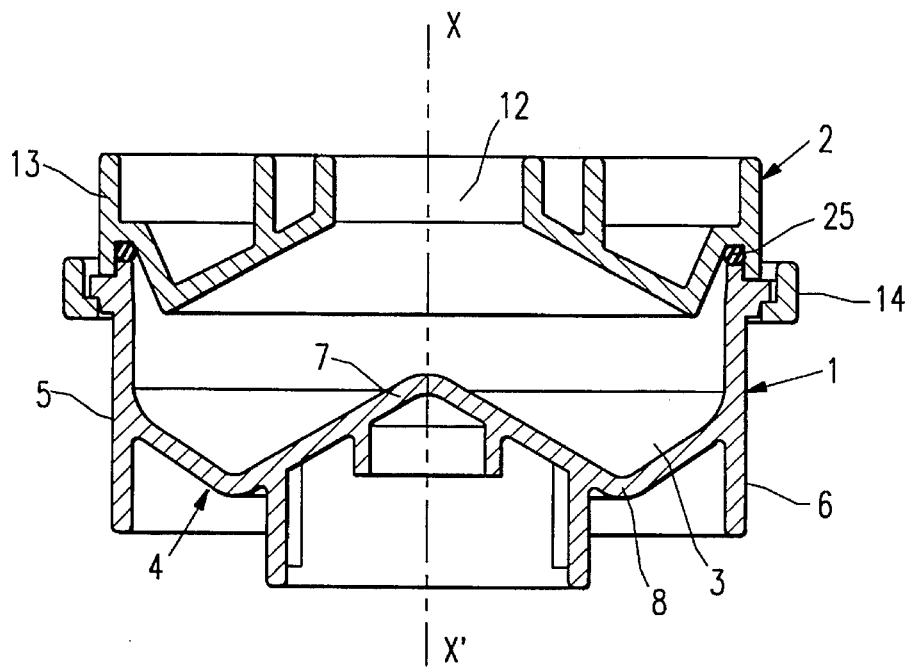
FIG. 1
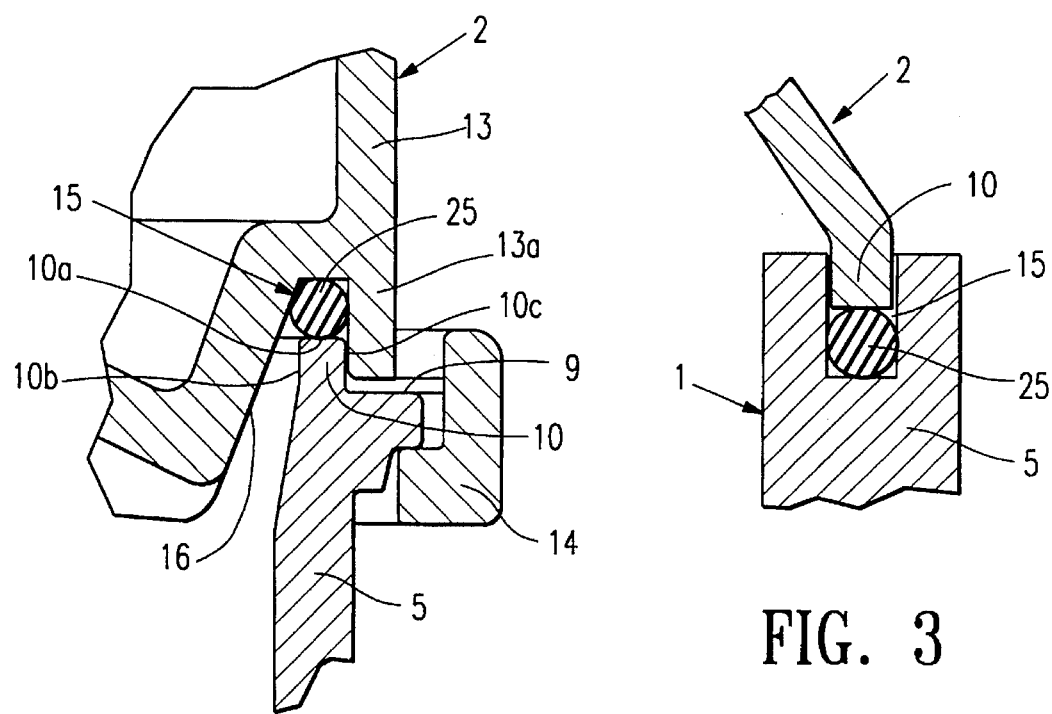
FIG. 2
FIG. 3

CENTRIFUGAL TYPE EXTRACTION CELL HAVING A DEFORMABLE SEALING JOINT FOR A HOT BEVERAGE PREPARATION MACHINE

CROSS-REFERENCE TO RELATED APPLICATION

This application is a Continuation-In-Part of application Ser. No. 08/338,105 filed Nov. 9, 1994 abandoned.

BACKGROUND OF THE INVENTION

The present invention relates to the general technical field of machines for preparing hot beverages, and particularly coffee, in which the hot beverage is obtained by bringing a liquid into contact with aromatic grounds.

The present invention concerns, more specifically, an extraction cell, or unit, of the centrifugal type for a hot beverage preparation machine, preferably a coffee maker. The extraction cell includes a drum for retaining grounds, on which drum is mounted, in a fluid-type manner, by the intermediary of a sealing means, a cover provided with a liquid delivery orifice, the cell also including filtering means.

In the description which will follow, reference will be made particularly to coffee makers, which are presently the preferred class of machines in which the invention is to be employed. However, it should be readily apparent that the invention is applicable to all types of machines capable of preparing a hot drink by centrifuging, such as tea, for example.

In the preparation of coffee, and in particular for the preparation of espresso coffee, it is known that the consumer desires to obtain a coffee beverage having a certain quantity of foam at its surface. The consumer also desires that the quantity of foam obtained as a result of centrifugal filtration can remain at the surface of the coffee for a sufficiently long period of time. It is therefore also known that in coffee makers of the centrifugal type, it has been found to be extremely difficult to, at one and the same time, obtain a significant amount of foam and maintain that foam for a long period of time at the surface of the liquid. The phenomena involved in the creation of foam are presently insufficiently well understood to be completely mastered. It is simply known that the creation of foam is linked to the pressure resulting from the loss of charge, or pressure, of the liquid when it passes through the grounds, as well as the proportion of air mixed with the grounds and with the hot water in the filter, the proportion of foam obtained increasing with increases in pressure. In addition to the relatively poor understanding of the optimal conditions for obtaining foam by centrifuging, it has been found difficult to increase, in a significant manner by conventional means, the quantity of foam obtained in a centrifuge machine. In effect, a simple means frequently utilized until the present consisted precisely in increasing the operating pressure of the centrifuge machine in order to increase the quantity of foam produced. Such a pressure increase is obviously limited because of the attendant risk of degradation or rupture of parts resulting from a high pressure in the extraction cell and the filter. It is also in order to note that the possibilities of increasing the operating pressure are also connected in part with the capability of increasing the rotation speed of the extraction cell, such a speed increase also being limited because of mechanical considerations and having a negative influence on the total manufacturing cost of the apparatus.

In practice, centrifugal coffee machines thus present a number of limitations with regard to their possibility of furnishing significant quantities of long-lasting foam.

It has, however, already been proposed, in French Application No. 2487661, to provide a centrifugal coffee maker capable of assuring the production of foam at the surface of the coffee. In a conventional manner, the extraction cell is formed of a collecting drum on which is mounted, with the aid of latching means and sealing means, a cover defining, with the drum, a collection volume for the grounds and the hot water. Filtration of the water-grounds-air mixture is assured by a filtration means consisting of a series of radial grooves distributed around the periphery of the extraction cell and arranged between the cover and the drum. The centrifugal coffee maker includes, outside of the extraction cell, a deflecting wall against which the filtrate issuing from the radial grooves is projected at an acute angle. The combination of the projection angle, the speed of rotation and the action of the receiving wall is at the origin of the formation of a certain quantity of foam in the coffee.

If it can be considered that such a machine is capable of supplying coffee provided with foam, it is no less the case that its construction is relatively complex. In effect, it is necessary that the receiving wall and the drum be fabricated and disposed relative to one another with narrow dimensional tolerances in order to obtain a significant quantity of foam and to avoid pressure drops in the extraction cell. The fabrication of pieces having such close tolerances cannot be achieved without a significant increase in the total cost of the machine.

Moreover, it is already known, for example from French Patent No. 1584848, to reinforce the sealing of an extraction cell by mounting an annular sealing joint between the drum and the cover. The annular joint performs the classic functions assigned to a sealing joint without at the same time improving in a particularly observable manner the production of foam, the overall fluid tightness of such a system diminishing, in addition, significantly in the course of time as a result of wear experienced by the joint.

SUMMARY OF THE INVENTION

An object of the present invention is to overcome the above-described difficulties and to provide an extraction cell which is preferably usable on a hot beverage machine of the centrifugal type, and capable of assuring the production of a significant quantity of long-lasting foam with the aid of particularly simple and effective means.

Another object of the invention is to provide an extraction cell capable of furnishing an appreciable quantity of long-lasting foam regardless of variations in rotational speed of the extraction cell.

The above and other objects are achieved, according to the present invention by the provision of an extraction cell of the centrifugal type for a hot beverage preparation machine, comprising a grounds collection drum on which is mounted, in a sealed manner by sealing means, a cover provided with a liquid delivery orifice, and a filtration means, wherein the filtration means and the sealing means are constituted by at least one deformable joint, or seal, interposed in a groove between the drum and cover, the joint having deformation properties, and being mounted to be compressed by an amount which is in a pre-established compression range with the aid of a compression controlling means, in a manner to insure that below a pre-established operating pressure existing in the cell, fluid tightness of the cell is maintained, and beyond that pressure, filtration of the grounds-liquid mixture occurs by deformation of the joint.

BRIEF DESCRIPTION OF THE DRAWING

Other particularities and advantages of the invention will become more readily apparent from a reading of the detailed description which will be presented below with reference to the attached drawing, given by way of an illustrative and non-limiting example, in which:

FIG. 1 is an elevational, cross-sectional view of one embodiment of an extraction cell according to the invention.

FIG. 2 is an elevational, cross-sectional detail view of a portion of the embodiment of FIG. 1.

FIG. 3 is an elevational, cross-sectional detail view of a modified form of construction of the embodiment of FIG. 1.

DESCRIPTION OF THE PREFERRED EMBODIMENTS

Figure 4:
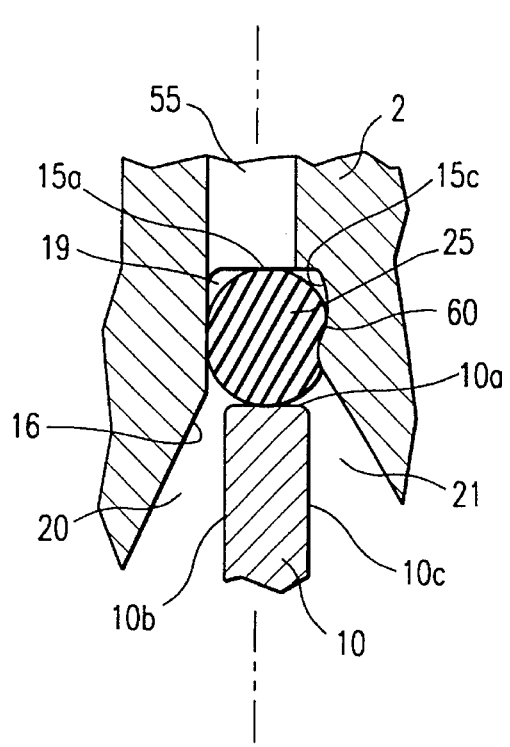
FIG. 4 is an elevational, cross-sectional detailed view of a portion of an extraction cell according to an embodiment of the invention in a first operating state.

The centrifugal extraction cell shown in FIG. 1 is formed of a drum 1 upon which is mounted a cover 2 defining with drum 1 an internal volume 3 for receiving and collecting grounds and hot water. In the embodiment shown in FIG. 1, the extraction cell preferably defines a principal body of revolution about a principal axis x–x', with respect to which the cell is mounted for rotation by the intermediary of a drive system (not shown). The drum 1 has a bottom 4 and a lateral wall 5 which is preferably circular, bottom 4 and lateral wall 5 defining the exterior envelop of drum 1. Advantageously, lateral wall 5 is extended at its lower part by a skirt 6 enveloping bottom 4. In a manner which is equally advantageous, bottom 4 is constituted by a central zone 7 in the form of an inverted cone whose peak is situated on the x–x' axis and is directed toward cover 2 in a manner to constitute an inverted cone. The central zone 7 is connected to lateral wall 5, starting from the base of the cone, by an annular wall 8 which forms substantially a dihedral right angle with the envelop of the cone. In the embodiment shown in FIGS. 1 and 2, the upper part of lateral wall 5 has an external shoulder 9 bordering all or part of the periphery of lateral wall 5. The external shoulder 9 is extended at the upper part of lateral wall 5 by a rib 10 delimited by an upper face 10a, an internal lateral face 10b and an external lateral face 10c (see FIGS. 2 and 4–6).

Figure 7:
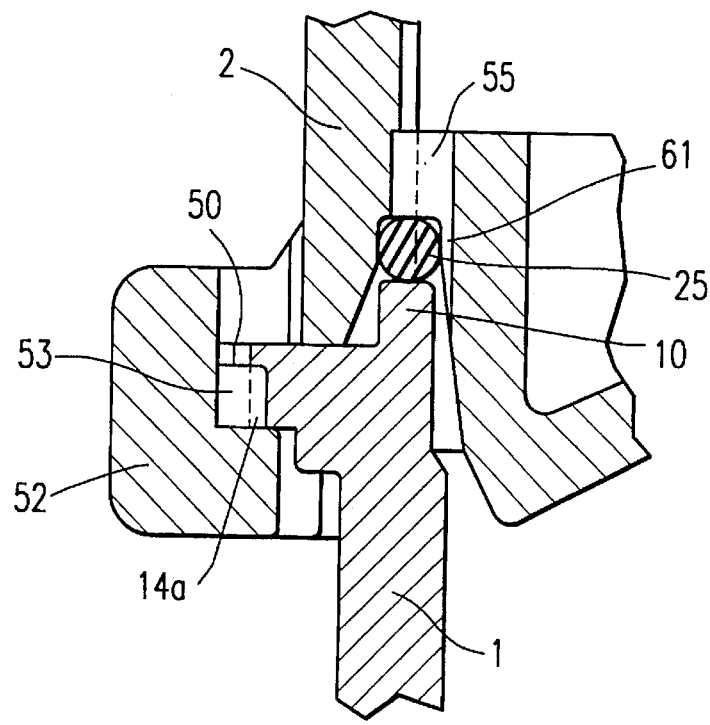
FIG. 7 is an elevational, cross-sectional detail view of a portion of a rotatable extraction cell according to a preferred embodiment of the invention.

The cover 2 has the form of a body of revolution around axis x–x', comprising a central opening, or passage, 12 via which hot water can be admitted into the extraction cell. The cover 2 is intended to be mounted on and latched, or bolted, to drum 1. For this purpose, cover 2 is delimited by an external envelop 13 extending substantially along the generatrices of skirt 6, envelop 13 being provided with an external segmented flange 14 having, at the interior thereof, inclined ramps 14a (FIG. 7). The profile of each ramp 14a is formed to cooperate with external shoulder 9 in a manner to form a known latching means, for example a bayonet connection, permitting latching, by rotation about the axis x–x', of cover 2 relative to drum 1. It is equally possible to reverse the mounting and to provide ramps 14a on drum 1.

Figure 5:
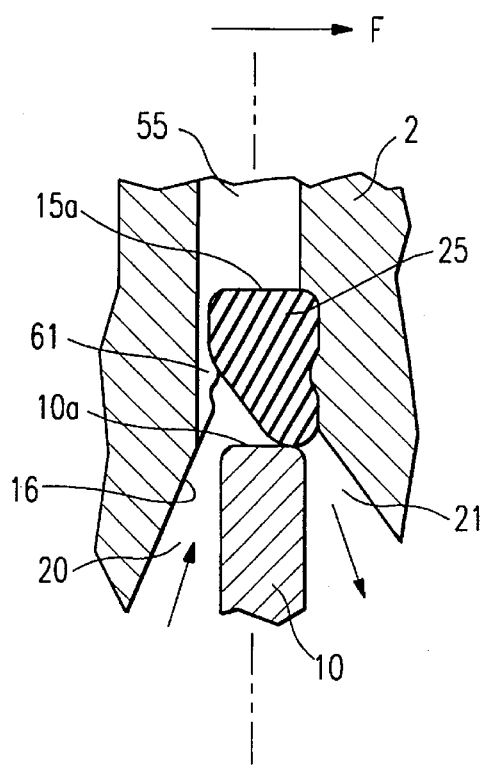
FIGS. 5 and 6 are views similar to that of FIG. 4 showing two other operating states of an extraction cell according to the invention, FIGS. 5 and 6 showing a variation of the embodiment of FIG. 4.
Figure 6:
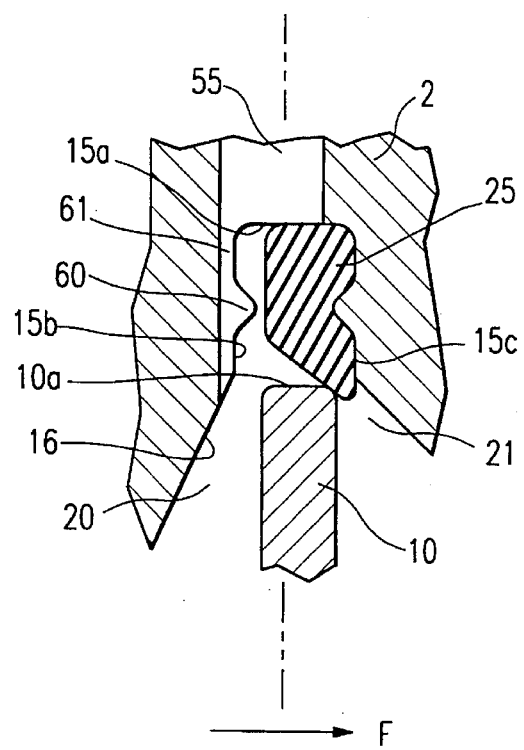

The cover 2 has a form and profile adapted to that of drum 1, and it comprises a groove 15 extending substantially at the periphery of cover 2 and arranged between a terminal edge 13a of external envelop 13 and an annular wall 16 which is inclined, for example at an angle of the order of 5° to 8° with respect to axis x–x', prolonging in a radially interior direction external envelop 13 from a zone situated above terminal edge 13a. The groove 15 preferably extends around the entire periphery of cover 2 and presents a transverse cross section comparable to a quadrilateral, and preferably a square or rectangle. As shown in FIGS. 4 to 6, groove 15 is bounded by an upper wall 15a and two opposing lateral faces, internal face 15b and external face 15c. The groove 15 is intended to permit partial introduction of rib 10, up to an abutment position such that, in the latching position of cover 2 on drum 1, an annular space 19 is created between upper face 10a, and the walls 15a, 15b and 15c of groove 15. This annular space has a predetermined cross section when rib 10 projects to the maximum possible extent into groove 15, i.e. when seal 25 is fully compresses, as shown in FIG. 7. The transverse cross section of this space is, for example, square, or preferably rectangular. The abutment position is obtained by the intermediary of a compression control means 50 (FIG. 7), which will be described in detail below.

The width of groove 15a is made greater than that of upper face 10a, in order to provide an internal annular fluid flow zone 20 between internal lateral face 10b and internal face 15b and an external annular fluid flow zone 21 between external lateral face 10c and external face 15c. The annular space 19 is intended to receive a deformable seal 25 made of any suitable material having good deformation properties, and for example based on a silicone material or a material of the NBR (nitrile) type. In the static latching position, such as shown for example in FIG. 2 or 4, deformable seal 25 assumes a form which assures the maintenance of a seal between internal volume 3 and the external region surrounding the cell. The deformable seal 25 is maintained in place against the base of groove 15 by a compression means that is fixed to drum 1. In the illustrated embodiment, the compression means are constituted by upper face 10a, of rib 10 and its compression action is controlled by a mechanical abutment element 53 (FIG. 7) of lateral wall 50 interposed between drum 1 and cover 2. The lateral wall 53 is preferably formed, such as shown in FIG. 7, by one or several mechanical abutment elements 53 fixed to cover 2 and arranged in or on attachment ears 52. Attachment ears 52 are formed to engage ramps 14a located at the periphery of drum 1 and to compress deformable seal 25 in a preestablished compression range. According to a preferred embodiment, lateral wall 50 comprises six abutment elements 53 associated with an equal number of attachment ears 52 and ramps 14a. The slope of each one of ramps 14a is of the order of 5° around the periphery of the cell and permits, for each relative rotation between drum 1 and cover 2 corresponding to an advance of one millimeter of each attachment ear 52 on one of the associated ramps 14a, an axial (i.e vertical in FIG. 7) compression of deformable seal 25 of the order of around 0.1 mm.

Figure 8:
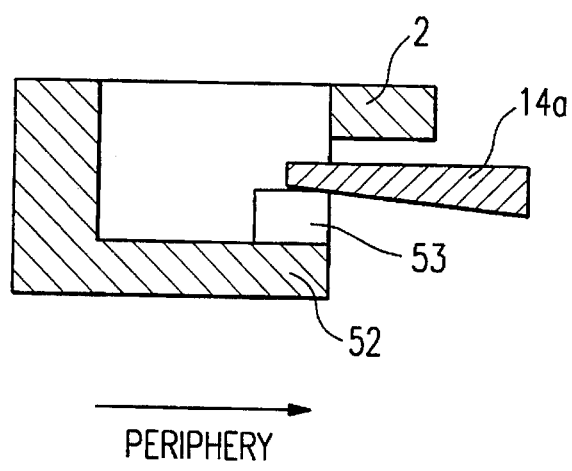
FIG. 8 is a developed, pictorial detail view taken in a radial direction from the interior of the cell of FIG. 7.

The relation between a ramp 14a and a mechanical abutment element 53 is shown in FIG. 8, which is a developed view, i.e. a view in a plane corresponding to the periphery, or circumference, of the extraction cell, looking outwardly from the center of the cell. Ear 52 is fixed to, or integral with, cover 2, while ramp 14a is fixed to, or integral with, drum 1. When, with respect to the view of FIG. 8, cover 2 is rotated relative to drum 1 so that cover 2 moves to the right relative to drum 1, cover 2 is displaced downwardly relative to drum 1 and the axial compression of seal 25 increases.

The presence of a mechanical abutment element 53 substantially at the middle of each one of attachment ears 52 blocks the latching and limits the clamping torque of deformable seal 25 to a pre-established compression value, which is variable according to the nature, the form and the material of deformable seal 25, and for example a maximum torque of around 4.4 N.m for a cell having a diameter of around 8 cm.

Figure 9A:
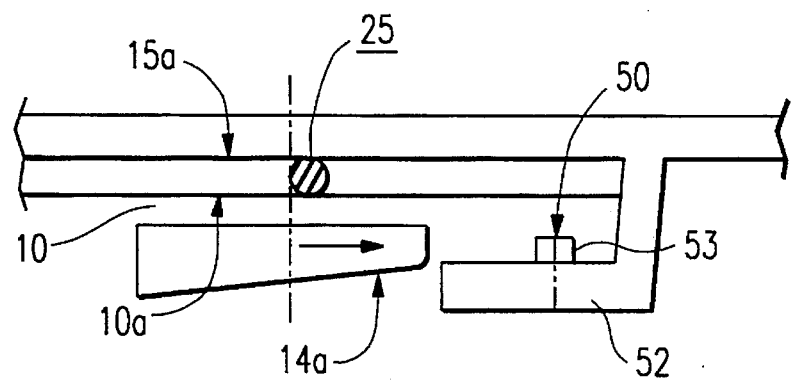
FIGS. 9A–9C show three stages in the closing of two parts of an extraction cell according to the invention.
Figure 9B:
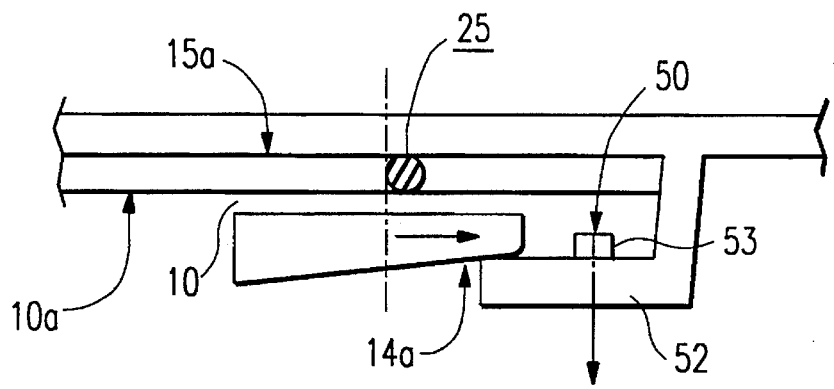
Figure 9C:
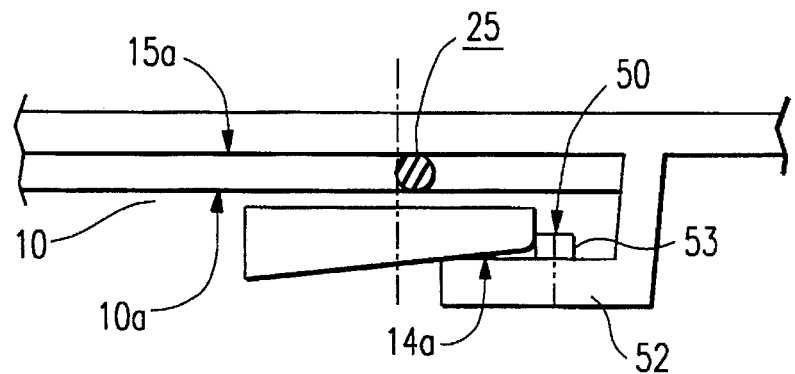

A structure similar to that of FIG. 7 for compressing annular seal 25 between cover 2 and drum 1 is shown in FIGS. 9A, 9B and 9C, which show successive steps in the compression of annular seal 25.

In FIGS. 9A, 9B and 9C, elements identical to those previously described are identified with the same reference numerals.

Initially, as shown in FIG. 9A, seal 25 is in contact with face 10a, and upper wall 15a. Then, during relative rotation between cover 2 and drum 1, a vertical compression is applied to seal 25, the amount of compression being proportional to the angle of relative rotation between those parts. This places the seal under a precompression and its position remains stable because: the inclination of each ramp 14a is shallow, 5° for an exterior diameter of 86–90 mm; and the seal, of silicone or nitrile exerts, by its intrinsic adherence, a reaction on the relatively movable parts which tends to oppose relative rotational movement in a direction to remove the compressive force, i.e. a braking function is produced.

Finally, the position shown in FIG. 9C is reached where ribs 10 are engaged by a maximum amount in abutment against an associated element 53. This position is selected to assure that a jamming will not occur between cover 2 and drum 1, which would prevent them from being separated. In addition, the abutment position is selected to limit the compression of seal 25 in order to permit the main function of filtration to be reliably performed.

If the significant pressure on the periphery of the seal were too high: the seal could not be deformed correctly to allow passage of liquid; and the useful life of the component would be greatly reduced.

A further advantage of the system according to the invention is that a change in the force necessary to secure drum 1 and cover 2 together would indicate to the user that the seal 25 is missing or that it has become so worn that replacement is necessary.

From the point of view of safety, the attachment system is self-blocking: in the absence of a seal 25 or in case it becomes substantially worn, rotation in a disassembly direction is opposed by the inertia of the self-closing pieces and by adherence remain joined together as the centrifugal device decelerates and comes to a stop.

According to the invention, deformable seal 25, having a cross-sectional diameter of around 2.6 mm, constitutes not only the sealing means, but also the filtration means of the extraction cell. For this purpose, deformable seal 25 interposed between drum 1 and cover 2 has deformation properties which permit it to assure, for a fixed and predetermined level of compression with the aid of the compression control means 50 below the pre-established operation pressure existing in the cell, a sealing of the latter, and above that pressure a filtration of the grounds-liquid-air mixture by deformation of deformable seal 25. For this purpose, the hardness of deformable seal 25 is substantial and will be between 50 and 90 Shore A and preferably between 65 and 75 Shore A, the average value being of the order of 70 Shore A.

The transverse cross section of deformable seal 25, when undeformed, could be for example circular, such as shown in FIGS. 2–5, or even for example square or rectangular.

As a result of these deformation and compression control characteristics, as well as of the mounting of deformable seal 25 in groove 15, whose base extends substantially radially with respect to the axis of symmetry or rotation x–x' of the extraction cell, deformable seal 25 can perform the dual function of sealing and filtration. In effect, during latching of cover 2 on drum 1, rib 10 acts to lightly compress deformable seal 25 disposed in groove 15, deformable seal 25 occupying at least a part of annular space 19. The structural play between the parts and the compression tolerances can be usefully taken up by the bayonet latching system and compression control means 50, as can wear experienced by deformable seal 25. In this sealing position, and up to a pre-established internal operating pressure corresponding to a certain speed of rotation of the extraction cell, deformable seal 25 always maintains a shape to perform a sealing function preventing the water-grounds-air mixture from passing from the interior of the extraction cell toward the outside. Thus, such as shown for example in FIG. 4, the mixture is maintained in internal annular flow zone 20 without being able to reach external annular flow zone 21. After a certain latent period corresponding to attainment by the cell of its average rotation speed, the combination of the centrifugal force F and the pressure exerted by the mixture permits deformable seal 25 to come progressively to occupy a limit position of filtration shown in FIG. 5. In this position, deformable seal 25 is applied and compressed against external face 15c, allowing liquid to pass from internal annular flow zone 20 to annular space 19. After attainment of the critical operating pressure necessary for the further deformation of deformable seal 25, this latter undergoes an additional deformation, permitting a partial flow into external annular flow zone 21, such as shown in FIG. 6, such a deformation permitting a filtration of the mixture between upper face 10a, and deformable seal 25. In such a case, filtrate is evacuated and flows via external annular flow zone 21 and out of the cell.

At such time that the rotation of the cell can be interrupted and its speed of rotation diminishes to permit passage of the operating pressure to a value below the pre-established critical operation pressure, deformable seal 25 resumes its sealing position shown in FIGS. 2, 4 and 5.

In order to obtain good filtration effects and the production of a filtrate of good quality corresponding to an espresso coffee having long-lasting foam, it is advantageous, regardless of the transverse cross section of deformable seal 25, that deformable seal 25 occupy, when deformable seal 25 is not compressed, up to 120% of the cross-sectional area corresponding to the above-defined predetermined cross section of annular space 19. In a particularly advantageous manner, deformable seal 25 will occupy between 110 and 120% of that cross-sectional area, and will thus have between 10 and 20% of its volume outside of that cross-sectional area.

Other embodiments can obviously be imagined without departing from the framework of the invention. Thus, as shown in FIG. 3, it is possible to form groove 15 in drum 1 and for example in its lateral wall 5, rib 10 then being fixed to, or a part of, cover 2.

The invention thus permits, with the aid of particularly simple and inexpensive means, since a dual function is performed by a single piece, to obtain espresso coffee having abundant and long-lasting foam. It is also important to note that regardless of variations in the rotation speed of the extraction cell, the filtration is effectuated independently thereof, because the filtration is directly linked to the deformation properties of deformable seal 25, which can be accurately controlled. Solely by way of example, a practical operating pressure could be obtained by a rotation of an extraction cell having a diameter of around 8 cm, at a speed of the order of 4,500–12,500 revolutions per minute, the average being of the order of 7,000 revolutions per minute.

It is also obvious that the extraction cell can include several deformable seals 25 provided in defined sectors along the periphery of the cell. According to a variation illustrated in FIGS. 4–7, cover 2 can be provided with a series of perforations 55 arranged in groove 15, starting from upper wall 15a and placing annular space 19 in communication with the exterior of the cell.

Advantageously, perforations 55 are of circular cross section and are distributed regularly around the periphery of the cell, there being six such perforations provided, for example.

The perforations 55 permit a secure placement of deformable seal 25 at the bottom of groove 15 by allowing an escape of any air trapped between deformable seal 25 and upper wall 15a. Compressing of deformable seal 25 is thus perfectly mastered, to the same extent as filtration, and avoids the appearance of a phenomenon of flotation of deformable seal 25. Maintenance in place of deformable seal 25 can also be improved by the presence of two annular projections, or ribs, 60 (FIGS. 4 and 6) disposed to both sides of deformable seal 25, starting from internal face 15b and external face 15c, in order to laterally compress deformable seal 25 with an initial precompression, thereby aiding its retention. The perforations 55 also assure, (FIGS. 5–7) during rotation and filtration, a regulation of the internal pressure by permitting an escape of fluid which contributes to maintaining the pressure for operation of the cell and a constant deformation of deformable seal 25.

With respect to the vertical plane of symmetry of upper wall 15a, perforations 55 are formed so that their axes of symmetry do not coincide with that plane and are, on the contrary, slightly off-set radially toward the interior of the cell, as shown in FIGS. 5 and 6. This form of construction permits the formation of an overpressure channel 61 extending from the internal side of each of perforations 55 in order to open into groove 15 and in particular into internal annular flow zone 20, and to thus communicate with the latter.

In the case where the extraction cell comprises, for example, six perforations 55, each of them is associated with a respective overpressure channel 61. The essential operation of the overpressure channel or channels 61 is to maintain the internal operating pressure in the pre-established pressure range, while allowing and initiating an escape of fluid at a pressure slightly below that normally permitted by the presence of perforations 55 alone in case of a momentary overpressure on deformable seal 25 (FIG. 6). In effect, strong increases in pressure can occur in a transient manner during rotation of the cell, in which case deformable seal 25 will be pressed against external face 15c by the centrifugal force and by the liquid and, while being partially extruded into external annular flow zone 21, sufficiently opens channels 61 to permit the pressure to again drop in a substantially instantaneous manner. The channels 61 thus contribute to increasing the safety and reliability of operation.

According to another embodiment, not shown in the figures, channels 61 can be independent of perforations 55.

This application relates to subject matter disclosed in French application No 93 13606, filed on Nov. 9, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An extraction cell of the centrifugal type for a hot beverage preparation machine, comprising: a drum (1) for retaining a mass of a finely divided product from which the beverage is to be prepared; a cover (2) provided with a liquid delivery orifice (12) for forming a mixture of liquid and the finely divided product, said cover being mounted on said drum; sealing means interposed between said drum and said cover; and filtration means for separating, from the finely divided product, liquid which has formed the mixture with the finely divided product, wherein both said filtration means and said sealing means are constituted by at least one deformable seal (25) having deformation properties, and being mounted, to insure that below a pre-established operating pressure existing in said cell, fluid tightness of said cell is maintained, and beyond the preestablished operating pressure, filtration of the finely divided product-liquid mixture occurs by deformation of said seal.

2. An extraction cell as defined in claim 1 wherein said deformable seal is interposed between said drum and said cover and is disposed in a groove formed in one of said drum and said cover.

3. An extraction cell as defined in claim 2 wherein said extraction cell has a vertical axis of symmetry about which said extraction cell is rotatable, and said groove has an upper wall extending substantially radially with respect to the axis of symmetry of said cell.

4. Extraction cell according to claim 3 wherein said cover has a peripheral wall defining an external envelope of said cover, said groove is formed in said peripheral wall, and said extraction cell further comprises compression means (10) fixed to said drum.

5. An extraction cell according to claim 4 wherein said drum has a peripheral wall (5) and said compression means comprise a rib forming part of said peripheral wall and having an upper face which bears in a sealing manner against said deformable seal, said rib has first and second lateral faces, and said groove has an internal face and an external face each forming with a respective face of said rib a respective annular flow zone (20, 21) to assure, respectively, arrival of the finely divided product-liquid mixture and passage of the beverage after filtration between said deformable seal and said upper face.

6. An extraction cell as defined in claim 2 wherein said deformable seal and said groove extend around the entire circumference of said cell to form an annular seal and an annular peripheral groove.

7. An extraction cell according to claim 1 further comprising compression control means operatively associated with said deformable seal for compressing said deformable seal by an amount within a pre-established compression range.

8. An extraction cell as defined in claim 7 wherein said compression control means is interposed between said drum and said cover and comprises a mechanical abutment element for controlling the compression imposed on said deformable seal.

9. An extraction cell as defined in claim 8 wherein one of said drum and cover is provided with at least one overpressure relief channel (61) interposed between said deformable seal and said groove.

10. An extraction cell as defined in claim 9 wherein said groove has an upper wall and is provided with perforations extending between said upper wall and the region surrounding said cell.

11. An extraction cell as defined in claim 10 wherein each said overpressure relief channel is constituted by an interior extension of a respective one of said perforations which is associated with the respective overpressure relief channel at the side thereof toward the interior of said cell and which opens into said groove.

12. Extraction cell according to claim 1 wherein said groove has a cross-sectional area and said deformable seal is constructed to be placed in a sealing state in which the cross section of said deformable seal occupies an area not greater than 120% of the cross-sectional area of said groove.

13. An extraction cell as defined in claim 12 wherein the cross section of said deformable seal, when in the sealing state, occupies between 110% and 120% of the cross-sectional area of said groove.

14. An extraction cell as defined in claim 1 wherein said deformable seal is made of a material selected from a silicone material and NBR material, having a Shore A. hardness of between 50 and 90.

15. An extraction cell as defined in claim 14 wherein the Shore A hardness of said deformable seal is between 65 and 75.

16. An extraction cell as defined in claim 1 wherein said deformable seal has a cross section which is one of circular, square and rectangular.

17. In a hot drink preparation machine, the improvement comprising an extraction cell as defined in claim 1.

18. In a centrifugal coffee maker, the improvement comprising an extraction cell as defined in claim 1.

* * * * *